No. 668,311. Patented Feb. 19, 1901.
E. W. HOWELL.
APPARATUS FOR ARTIFICIAL REFRIGERATION.
(Application filed Nov. 23, 1899.)
(No Model.) 4 Sheets—Sheet 1.
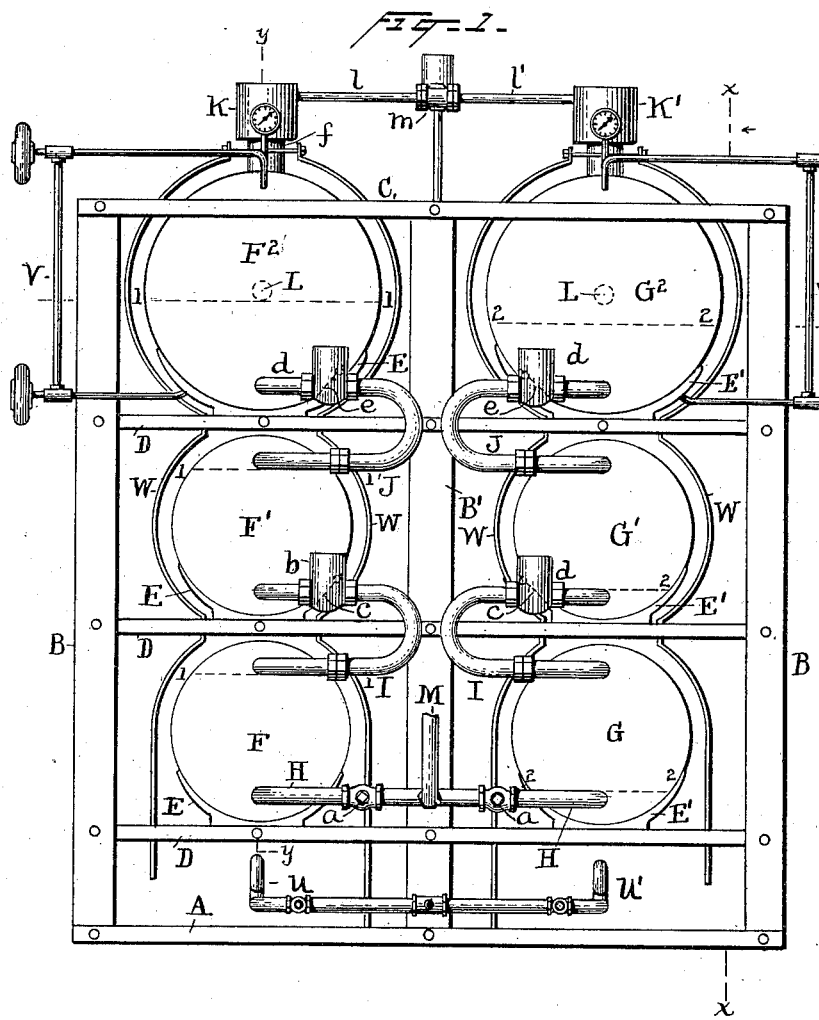
WITNESSES:
Norris A. Clark.
Aly Scott
INVENTOR
Edward W. Howell
BY
ATTORNEY

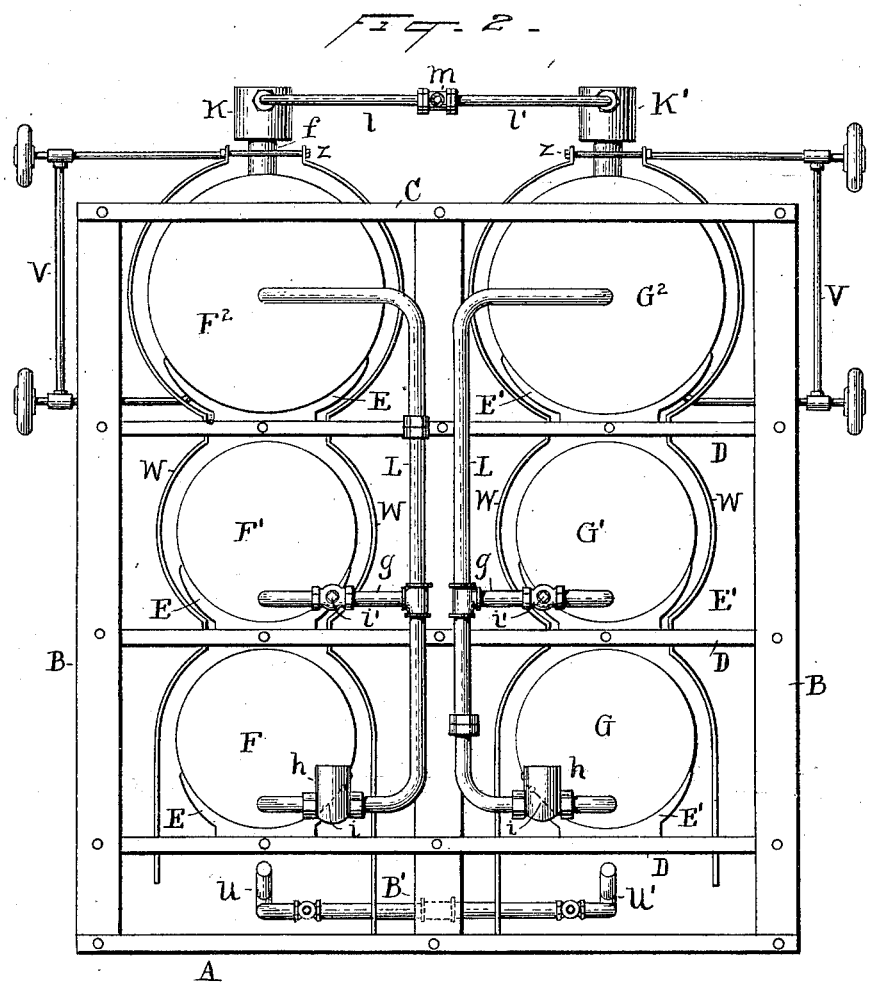

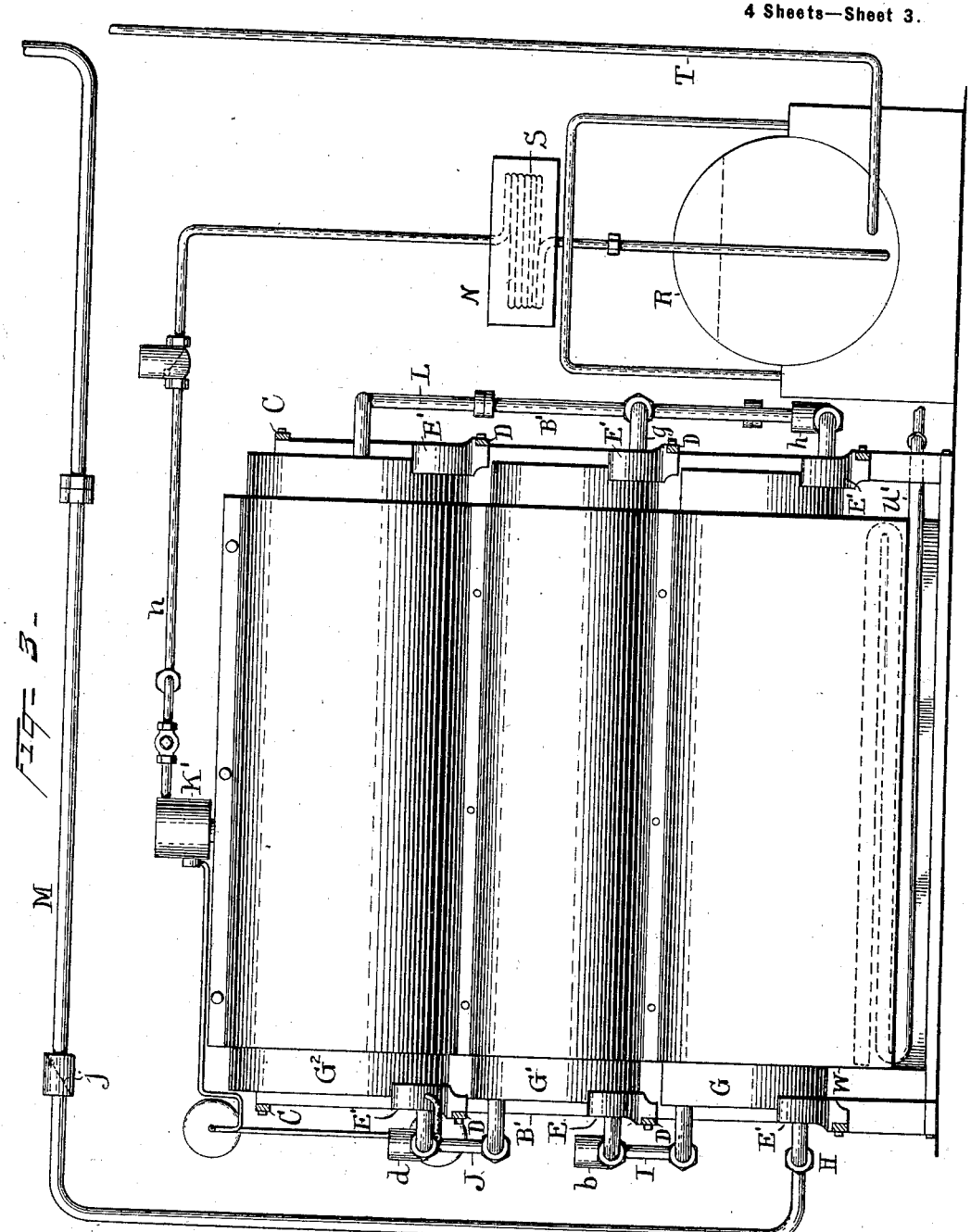

No. 668,311. Patented Feb. 19, 1901.
E. W. HOWELL.
APPARATUS FOR ARTIFICIAL REFRIGERATION.
(Application filed Nov. 23, 1899.)
(No Model.) 4 Sheets—Sheet 4.
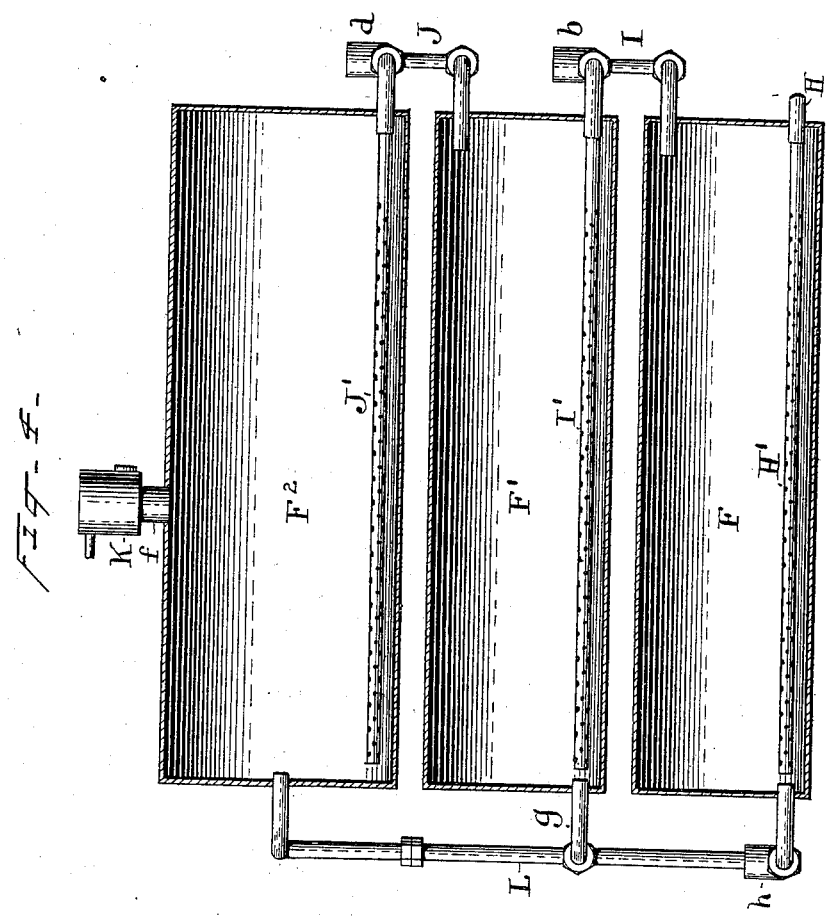
WITNESSES:
Norris A. Clark
Alex. Scott
INVENTOR
Edward W. Howell
BY
ATTORNEY

UNITED STATES PATENT OFFICE.

EDWARD W. HOWELL, OF NEW YORK, N. Y., ASSIGNOR TO THE DRY AIR REFRIGERATOR COMPANY, OF SAME PLACE.

APPARATUS FOR ARTIFICIAL REFRIGERATION.

SPECIFICATION forming part of Letters Patent No. 668,311, dated February 19, 1901.

Application filed November 23, 1899. Serial No. 738,052. (No model.)

*To all whom it may concern:*

Be it known that I, EDWARD W. HOWELL, a citizen of the United States, residing at New York, borough of Manhattan, in the county of New York and State of New York, have invented certain new and useful Improvements in Apparatus for Artificial Refrigeration; and I do hereby declare the following to be a full, clear, and exact description of the invention, such as will enable others skilled in the art to which it appertains to make and use the same.

My invention relates to apparatus for producing artificial refrigeration by the ammonia-absorption system.

In a previous application, filed July 11, 1899, Serial No. 723,429, I have described a process or method of absorbing the expanded gas without the use of artificial means for controlling the temperature. The said process or method consists in absorbing the gas in a body of weak liquor and when the temperature rises and pressure develops to such a degree as to interfere with absorption removing the hot gas into another body of weak liquor and when the temperature of this body increases and pressure develops in like manner removing the hot gas into a third body and continuing to remove the hot gas when similar conditions prevail through a series of bodies of weak liquor so long as expansion continues and until the expanded gas has all been absorbed, the several bodies of weak liquor restored to their original strength approximately, and the pressure in the various parts of the apparatus is substantially uniform.

One object of my present invention is to produce an absorption refrigerating apparatus whereby continuous absorption of the expanded gas by the weak liquor remaining from distillation of the aqua-ammonia can be promoted and carried on without the use of artificial means for keeping down the temperature of the apparatus and the absorbing liquor.

A further object of my invention is to produce an apparatus in which the steam generated by overheating the ammonia-water will be condensed before leaving the still, and thus its passage over to the condenser and receiver will be prevented.

A further object of my invention is to construct an apparatus in which the return of the expanded gas to the generators and its reabsorption by the weak liquor from which it was distilled can be carried on continuously and automatically without producing back pressure in the expander, whereby the entire volume of gas distilled out of the ammonia-water can be restored thereto after it has expanded and done its duty in producing refrigeration without interrupting the absorption of the gas or producing back pressure in the expander.

In the accompanying drawings, Figure 1 represents a front end elevation of the refrigerating apparatus; Fig. 2, a rear end elevation of the same; Fig. 3, a sectional side elevation of the apparatus, the section taken on line $x\ x$ of Fig. 1; Fig. 4, a vertical section through one series of generators, the section taken on line $y\ y$ of Fig. 1.

The apparatus in which distillation and absorption are carried on is constructed in two or more parts or sections, each of which forms a complete independently-operated system. Each of the parts or sections is arranged to be separately charged with aqua-ammonia; but all of them are connected by branch pipes fitted with suitable cocks with a single pipe that leads to a condenser and thence passes to the anhydrous-ammonia receiver, and the latter in turn is connected with the entrance end of the refrigerating-coil by means of a suitable pipe. A pipe also leads from the exit end of the refrigerating-coil back to the apparatus, and by means of branches fitted with suitable cocks it is connected independently with the bottom still or generator of each part or section of the apparatus.

The object in dividing the apparatus into two or more parts or sections is to enable two distinct operations to be carried on simultaneously—namely, the distillation of the ammonia in one or more parts or sections and the return of the expanded gas from the expander or refrigerating-coil to one or more of the other parts or sections and the weak liquor for reabsorption therein.

The apparatus shown in the accompanying drawings is inclosed in a framework made of light angle-iron, and the generators and connecting-pipes which conduct the liquor and gases from and to the generators comprised in each part, as will hereinafter be described, are all connected with this framework in such a way that the entire apparatus can be moved bodily with the frame. This arrangement is adopted for convenience and to make it possible to move the apparatus with the greatest convenience from the factory to the place where it is to be used and to make the attachments with as little trouble as possible, the only skilled labor required in setting up the apparatus being that which will be applied to making the connections between the single pipe leading from the generator to the condenser and receiver and the pipe leading from the anhydrous-ammonia receiver to the refrigerating-coil and the pipe leading from the exit end of the refrigerating-coil back to the generators and the connection between the condenser and the water-supply and waste pipes. This frame consists of the base-plates A A A A, uprights B B B B at the corners, and the intermediate uprights B' B', the top plates C C C C, and the transverse bars D D D at the front and rear ends of the frame. All these parts are securely bolted together to form a structure that can be moved as a whole.

On the transverse bars D D D at each end of the frame are bolsters E E E on one side of the two parts into which the frame is divided by the middle uprights B' B', and on the other side are similar bolsters E' E' E'. The bolsters on their upper sides approximate to a semicircle to adapt them to receive the ends of the cylindrical generators and they are bolted securely to the transverse bars. The generators for each part are arranged in a series of three or more and they are placed one above the other. The generators of one series (that on the left of Fig. 1) are designated by the letters F F' F², and those of the other series are designated by the letters G G' G², proceeding from the bottom upward to the top, corresponding to the order in which the distillation and absorption are carried on. At the front end of the generator F, Fig. 1, a pipe H, fitted with a cock $a$, enters the head of the generator and connects inside of the generator with a perforated pipe H', that is closed at its inner end. The said pipe H enters the head near the bottom of the generator, and the perforated pipe is close to the bottom of the generator, as shown more clearly in Fig. 4. Between the bottom generator F and the generator F' immediately above it is a U-shaped pipe I, the lower end of which enters the head of generator F near the top, and the upper end enters the head of generator F' near the bottom and connects with a perforated pipe I' inside of the generator. In the upper member of the U-shaped pipe is a valve-casing $b$, in which is a check-valve $c$, arranged to open toward the end of the pipe that enters generator F', so as to permit gas or liquor to flow into said generator F', but check any outflow therefrom. Between generators F' and F² there is another U-shaped pipe J, the lower end of which enters the head of generator F' near the top of the generator, and the upper end enters the head of the generator F² near the bottom and connects with a perforated pipe J' inside of the said generator near the bottom thereof. In the upper member of the U-shaped pipe J there is a valve-casing $d$, in which is a check-valve $e$, opening toward the end of the pipe that enters the generator F², so as to permit gas and liquor to enter said generator and check the outflow therefrom. Above the generator F² is a drum K, that communicates with the interior of the said generator through a pipe $f$.

At the rear end of the apparatus (see Fig. 2) the series of generators are connected together by a pipe L, the upper end of which enters the head of the generator F² at the center, and the lower end of which enters the generator F near the bottom, while the branch pipe $g$ enters the head of generator F' near the bottom. In this pipe near the bottom end is a valve-chamber $h$, in which is a check-valve $i$, opened toward the end of the pipe. In the branch $g$ is a cock $i$.

The generators G G' G² are fitted with a system of pipes similar to those of generators F F' F², which are correspondingly lettered, as are also the valve-casings and check-valves. The perforated pipes inside of the generators G G' G² are not, however, shown; but the construction and arrangement of these perforated pipes are precisely the same and the check-valves operated in the same manner as are those of the generators F F' F². The ends of pipes H H enter, respectively, the generators F G.

M is a pipe that connects by a T-joint with the pipes H H and leads thence to the exit end of the refrigerating-coil, which is not shown in the drawings. In this pipe is a check-valve $j$, opening toward the end of the pipe that connects with the pipes H H to check back pressure from the generators F G to the refrigerating-coil.

Drums K K' above the generators F² G² have pipes $l\ l\ l$ leading from them and which are connected together in a T-coupling $m$, and from this T-coupling a pipe $n$ leads to the condenser-tank N, and from the condenser-tank it is carried to the receiver R and its end is passed through the head of the receiver, terminating near the bottom. Within the condenser-tank a coil S is interposed in the pipe N. A pipe T is passed into the head of the receiver near the bottom and from there carried to and connected with the refrigerating-coil at the entrance end of the said refrigerating-coil, which, however, is not shown in the drawings.

The operation of this system is conveniently divided into three parts—namely, charging the generators with aqua-ammonia, distilling the aqua-ammonia, and returning the expanded gas after it has done its duty in the refrigerating-coil to the weak liquor from which it was distilled and bringing about the absorption of the expanded gas after it has done its duty in the refrigerating-coil by the weak liquor and through this absorption recharging the generators with the exact amount of rich liquor which they contained before the distillation took place.

*Charging the generators.*—To charge one system of generators—say F F′ F²—an ammonia-pump is connected with the cock in the pipe H next to the generator F, and aqua-ammonia at 26° Baumé is pumped into the generator F from the tank in which it is stored. The ammonia is driven through the bottom generator F, thence through the connecting U-shaped pipe I up into the generator F′, through this generator, and up into the generator F² through the U-shaped pipe J until enough has been pumped in to fill the upper generator up to the level of the equalizing-pipe L at the center of the said generator, the gage-glass V, connected with the generator F², showing the height which the liquid attains in the said generator. At this stage the generators F F′ and the connecting U-shaped pipes I J are all filled with ammonia, while the generator F² is only filled up to the end of the eqalizing-pipe L. Hence there is a surplus in the generators F F′, which it is necessary to get out. For this purpose the burners under the bottom generator F are started, and by means of the heat the liquor in generators F F′ is expanded and rises up into the top generator F², the check-valves opening inward, permitting it to pass, but preventing its return. This outflow from the generators F F′ continues until the level of the liquor in generators F F′ drops below the ends of the U-shaped pipes at the top of the receiving-cylinders, as indicated by the dotted lines 1 1, Fig. 1. It can be easily ascertained when the proper amount of liquor has been expelled from the generators F F′ by the rise of liquor in the gage-glass of generator F², it having already been determined how high the liquor will have to rise in that glass to reduce the liquor in the generators F F′ to the required level and the gage-glass properly marked. When the proper quantity of liquor has been forced into the generator F², the burners are extinguished. The excess of liquor in generator F² runs off through pipe L and enters the lower generator F, and from thence it passes through pipe H back into the tank or drum, the cock a being opened. When the height of the liquor in the gage-glass shows that the liquor in generator F² has fallen to the proper level, the cock a is closed, thus stopping the outflow from the bottom generator F. By this means the series of connected generators are charged with the exact quantity of aqua-ammonia required for the subsequent steps of the process or operation. The generators G G′ G² are charged in the same manner.

*Distillation of the aqua-ammonia.*—The generators being properly charged, the burners are lighted to heat up the liquor, and the operation proceeds as follows: The ammonia-gas as it is generated is driven off and accumulates in the upper part of generator F. When the pressure is great enough, it forces open the check-valve in the U-shaped pipe I and enters the generator F′, the ammonia in which is heated by the heated gas ascending from generator F. From the generator F′ the gas coming from generator F and that distilled in generator F′ enters the U-shaped pipe J and passes into generator F², forcing the check-valve open by its own pressure. The distillation of the bodies of ammonia in the several generators then proceeds until the pressure reaches about one hundred and twenty pounds to the square inch, by which time most of the ammonia is driven out of the liquor in the generators F F′ up into the generator F². When the above pressure has been reached, the cock in the pipe leading to the condenser is opened and the gas passes to the condenser, where it is condensed into anhydrous ammonia and forced into the receiver R under a pressure of, say, one hundred and twenty pounds to the square inch. The distillation must be continued until all the gas has been driven off from the liquor in the lower generators and the greater part from that in the top generator. This will be shown by the lowering of the liquor in the gage-glass of the generator F², the point to which it must fall to indicate the completion of the distillation being ascertained by testing the liquor from time to time when the first run is made and the gage-glass marked. This will have to be done but once, as a measure of the gage-glass will be taken or mark made thereon. When all the gas has been driven off, the burners are extinguished and the cock in the condenser-pipe closed. The quantity of liquor remaining in the generators at this stage is illustrated approximately in Fig. 1, where it will be observed that the quantity of liquor in each is reduced from the charge-level of the strong liquor indicated by the lines 1 1, 1 1, 1 1 to the lines 2 2, 2 2, 2 2 drawn across the generators G G′ G² in Fig. 1, which indicate the quantity of weak liquor remaining after distillation.

In generators F F′ practically all the ammonia is distilled out and the liquor completely impoverished, being but 10° Baumé, equal to water by that scale; but in generator F², owing to the greater bulk, the overcharging from the cylinders below, and the slightly-shorter time during which the distillation is carried on the weak liquor is approximately at about 12° Baumé, thus containing about 2° of ammonia. When the heat is shut off and the exit of gas from the top generator and dome is stopped, by closing the cock in the pipe n, leading to the condenser, considerable gas will remain in the dome and the space above the weak liquor in the generators. Some of the gas in the top generator and dome will pass downward through pipe L and be drawn into the bottom generator by the vacuum and by the absorptive action of the weak liquor therein. By the cooling down of the heated liquor a vacuum will be formed in each of the generators as the weak liquor will quickly reabsorb all the gas remaining in them. By this reabsorption of the gas the weak liquor in each of the generators will be increased more or less, and if there be sufficient in the top generator $F^2$ to raise the level of the weak liquor above the end of the equalizing-pipe this excess will flow through the equalizing-pipe down into the bottom generator F, which having been exposed to the greater and more prolonged heat will have parted with a greater or less quantity of water in the form of steam which will have been condensed in the top generator $F^2$. Hence the bottom generator will take up the over-supply in the top generator until the liquor therein falls below the end of the equalizing-pipe. By this means the body of the liquor in the bottom generator F will be increased to about the quantity it contained when originally charged less the amount of gas distilled over and condensed into anhydrous ammonia.

The vacuum in generators F F' holds the check-valve between the generators closed, and thus they retain the liquor remaining of the original charge after driving off the gas, so that by restoring to the weak liquor in the generators the quantity of gas taken out the liquor in each will be brought up to its original strength of 26°. This result is accomplished by returning the gas to the generators after it has performed its duty in the refrigerating-coil and causing it to be taken up or reabsorbed by the respective bodies of weak liquor in the several generators.

*Absorption of the ammonia-gas.*—This part of the operation or process will be described for clearness in connection with the generators G G' $G^2$, in which the quantity of weak liquor remaining in the several generators after distillation is indicated by the lines 2 2, drawn across the generators G G' $G^2$, respectively. It will be observed that generators G G' contain about the same quantity of weak liquor, while generator $G^2$ has a little more than the others, this difference being brought about by the condensation of steam driven out of the lower generator by the excess of heat therein. When refrigeration is going on, the cock a in the pipe H, which leads into generator G, is opened to permit the expanded gas to return to the bottom generator G through the perforated pipe H', where it comes under the influence of the vacuum in that generator. The vacuum acts upon it like a pump and draws it rapidly through the fine perforations in the pipe H', and it mingles with the weak liquor in the generator. The incoming gas is absorbed by the weak liquor; but when more gas enters than the weak liquor will take up it accumulates in the vessel and the vacuum is broken, and when the pressure becomes great enough it forces open the check-valve c and is drawn by suction through the pipe I and perforated pipe I' into the weak liquor in the next vessel and absorption proceeds therein and continues until temperature and pressure develop to such a degree therein as to check or retard absorption, whereupon free gas accumulates, and when this occurs the check-valve e is forced open by the pressure and the gas is drawn through the pipe J and perforated pipe J' into the weak liquor in the third vessel of the series and is absorbed therein. While expansion continues the gas enters the apparatus and passes through the vessels successively as the pressure in each becomes great enough to open the check-valves, and absorption proceeds in the vessels so long as all the bodies of weak liquor are not fully saturated. Owing to the greater space in the last vessel of the series, the gas can continue flowing into it much longer than in the other vessels without pressure being developed sufficient to prevent the influx of gas. Furthermore, as the vacuum exists in the dome also no back pressure is produced sufficient to interfere with the inflow of expanded gas until the vacuum is broken. If the temperature in the last vessel of the series rises so high as to interfere with absorption, it is reduced by passing the hot gas down through the back pipe L into the first vessel. The temperature of this latter vessel and the liquor therein falls as the hot gas is drawn out into the other vessel of the series and also because of the influx of cold gas from the refrigerator-coil. At one end of the pipe L, therefore, is a body of hot gas and at the other a body of cold liquor. Hence owing to the affinity of cold water for ammonia the hot gas passes through the pipe L and the check-valve therein and enters the cold liquor in the first vessel, where it mixes with the cold gas and passes into the next vessel, and thence through the remaining vessels of the series, and finally reaches the last vessel. A circulation is then set up which continues with more or less energy so long as expansion continues and until the gas has been absorbed.

The generators may be heated by any suitable means, and the apparatus therefor is placed under the bottom one of each series of generators, as indicated by the burners U U'.

W W are jackets that inclose the sides of the generators and serve to direct the heat arising from below against the generators and also prevents the heat under one series of generators, where distillation is going on, from affecting the generators of the other series, which should be kept as cool as possible in order that absorption of the inflowing gas may not be interfered with when refrigeration is going on. The inner side of each jacket extends down to the floor or base of the frame; but the outer side is shorter, and thus a passage is left for the air to reach the burners. The two sides of the jacket are connected by lateral bolts $z\,z\,z$, passed through the contracted parts of the jacket between the lower and above the topmost generator. The products of combustion pass up through the space between the jackets and the generators and at the top they may be led through a pipe into the chimney or stack.

In practical refrigeration the two sets of generators are in use at the same time, distillation of the aqua-ammonia being carried on in one set and absorption in the other, the two sets of generators being used alternately for these operations.

The apparatus may be enlarged and its capacity increased to any extent within practical limits by adding to the number of generators in each set and also by combining a greater number of sets in a single apparatus, and by this expedient the apparatus can be constructed to refrigerate any amount of space that may be desired.

I claim—

1. In an apparatus for artificial refrigeration the combination of a series of vessels each of which is adapted to contain the absorbent liquor in separate bodies, pipes connecting adjoining vessels to convey the unabsorbed gas from one vessel containing a stronger liquor to the next in the series containing a weak liquor for progressive absorption of the gas in the successive bodies of liquor, an anhydrous-ammonia receiver, and a refrigerator coil or expander connected at its inlet end with the receiver and its outlet end connected with the first vessel of the series by a pipe provided with a check-valve, substantially as and for the purpose specified.

2. In an apparatus for artificial refrigeration, the combination of a series of vessels connected together by pipes provided with check-valves adapted to contain and hold the absorbent liquor under a vacuum, an anhydrous-ammonia receiver, and a refrigerator coil or expander connected at its inlet end with the receiver and at its outlet end with the first vessel of the series by a pipe provided with a check-valve, substantially as and for the purpose specified.

3. In an apparatus for artificial refrigeration the combination of a refrigerator coil or expander, an anhydrous-ammonia receiver, a vessel adapted to contain a body of absorbent liquor connected with the outlet end of the refrigerator coil or expander by a pipe provided with a check-valve into which the expanded gas is conveyed for absorption in the liquor therein, and a second vessel containing a body of absorbent liquor under a vacuum connected with the first vessel by a pipe provided with a check-valve through which the expanded gas is conveyed into the second vessel when absorption in the first vessel is checked and the pressure of the accumulating gas exceeds the pressure in the second vessel and forces open the check-valve in the pipe leading to the latter, substantially as specified.

4. In an apparatus for artificial refrigeration the combination of a refrigerator coil or expander, an anhydrous-ammonia receiver, a vessel adapted to contain a body of absorbent liquor under a vacuum connected with the outlet end of the refrigerator coil or expander by a pipe provided with a check-valve into which the expanded gas is conveyed for absorption in the liquor therein, and a second vessel containing a body of absorbent liquor under a vacuum connected with the first by a pipe provided with a check-valve through which the expanded gas is conveyed into the second vessel when absorption in the first vessel is checked and the pressure of the accumulating gas exceeds the pressure in the second vessel and opens the check-valve in the pipe leading to the latter, substantially as specified.

5. In an apparatus for artificial refrigeration the combination of a refrigerator coil or expander, an anhydrous-ammonia receiver, a series of vessels each of which is adapted to contain a body of absorbent liquor under a vacuum, pipes provided with check-valves connecting adjoining vessels to convey the expanded gas coming over from the refrigerator coil or expander into the first vessel successively from one vessel to the next in the series as the pressure in one rises above the pressure in the next and forces open the check-valves, substantially as specified.

6. In an apparatus for artificial refrigeration the combination of a refrigerator coil or expander, an anhydrous-ammonia receiver, a series of vessels each of which is adapted to contain a body of absorbent liquor, pipes provided with check-valves connecting adjoining vessels to convey the expanded gas coming over from the refrigerator coil or expander into the first vessel successively from one vessel to the next in the series as the pressure in one rises above the pressure in the next and forces open the check-valve, substantially as specified.

7. In an apparatus for artificial refrigeration the combination of a refrigerator coil or expander, an anhydrous-ammonia receiver, a series of vessels each of which is adapted to contain a body of absorbent liquor under a vacuum connected together by pipes provided with check-valves and the first vessel connected with the refrigerator coil or expander by a pipe provided with a check-valve, and a drum or dome forming a vacuum-chamber connected with the last vessel of the series only, substantially as specified.

8. In an apparatus for artificial refrigeration the combination of a refrigerator coil or expander, an anhydrous-ammonia receiver, a series of vessels adapted to contain separate bodies of absorbent liquor, pipes provided with check-valves connecting adjoining vessels, the first vessel of the series connected with the outlet end of the refrigerator coil or expander by a pipe provided with a check-valve, and a pipe provided with a check-valve connecting the last and first vessels of the series to convey the unabsorbed gas from the former to the latter when the pressure in the last vessel exceeds the pressure in the first, substantially as specified.

In testimony that I claim the invention above set forth I do affix my signature in presence of two witnesses.

EDWARD W. HOWELL.

Witnesses:
MILTON C. DONN,
ADAM RIENER.